(12) United States Patent
Hyodo et al.

(10) Patent No.: US 9,791,133 B2
(45) Date of Patent: Oct. 17, 2017

(54) LIGHTING CONTROL DEVICE, LIGHTING SYSTEM, AND METHOD OF CONTROLLING LIGHTING DEVICE

(71) Applicant: Panasonic Intellectual Property Management Co., Ltd., Osaka (JP)

(72) Inventors: Satoshi Hyodo, Hyogo (JP); Minoru Tanaka, Hyogo (JP); Tatsuya Sasago, Hyogo (JP); Haruka Miyagata, Kyoto (JP); Teruyuki Kimata, Tokyo (JP); Ryo Kawamura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/285,132

(22) Filed: Oct. 4, 2016

(65) Prior Publication Data

US 2017/0097141 A1    Apr. 6, 2017

(30) Foreign Application Priority Data

Oct. 6, 2015  (JP) .................................. 2015-198725

(51) Int. Cl.

| G06F 3/033 | (2013.01) |
| F21V 14/08 | (2006.01) |
| H05B 33/08 | (2006.01) |
| H05B 37/02 | (2006.01) |
| G06F 3/01 | (2006.01) |
| F21V 14/02 | (2006.01) |
| F21Y 115/10 | (2016.01) |

(52) U.S. Cl.
CPC .............. *F21V 14/08* (2013.01); *F21V 14/02* (2013.01); *G06F 3/011* (2013.01); *G06F 3/017* (2013.01);

(Continued)

(58) Field of Classification Search
CPC .......... G06F 3/011; G06F 3/017; F21V 14/02; H05B 37/0227

(Continued)

(56) References Cited

U.S. PATENT DOCUMENTS

2009/0195166 A1* 8/2009 Chen .................. H05B 33/0863
                                                     315/158
2010/0264830 A1    10/2010 Van Endert et al.
(Continued)

FOREIGN PATENT DOCUMENTS

| JP | 2008-016289 A | 1/2008 |
| JP | 2010-102900 A | 5/2010 |

(Continued)

*Primary Examiner* — Thuy Vinh Tran
(74) *Attorney, Agent, or Firm* — McDermott Will & Emery LLP

(57) ABSTRACT

A lighting control device includes a sensor that detects a state of a user and a gesture made by the user and a controller that controls a lighting characteristic of a lighting device. In the lighting control device and/or the lighting control method, it is determined (by the controller) whether a gesture made by the user and acquired by the sensor matches a first predetermined gesture including a predetermined hand shape and a predetermined movement of both hands of the user made within a detecting region between a boundary 30% larger than a periphery of a projection region illuminated by the lighting device and a boundary 30% smaller than the periphery of the projection region. When it is determined that the gesture matches the first predetermined gesture, a size of the projection region is changed (by the controller).

17 Claims, 11 Drawing Sheets

(52) U.S. Cl.
CPC ..... *H05B 33/0854* (2013.01); *H05B 33/0872* (2013.01); *H05B 37/0227* (2013.01); *F21Y 2115/10* (2016.08)

(58) Field of Classification Search
USPC .................................. 345/158; 382/103, 116
See application file for complete search history.

(56) References Cited

U.S. PATENT DOCUMENTS

| | | | | |
|---|---|---|---|---|
| 2010/0277074 | A1* | 11/2010 | Van Endert | ........ H05B 37/0227 315/149 |
| 2013/0120238 | A1* | 5/2013 | Spaulding | .......... H05B 37/0227 345/156 |
| 2013/0293722 | A1* | 11/2013 | Chen | ....................... F21V 14/02 348/164 |
| 2015/0023019 | A1* | 1/2015 | Chen | .................. H05B 33/0803 362/276 |

FOREIGN PATENT DOCUMENTS

| | | | |
|---|---|---|---|
| JP | 2011-503789 | A | 1/2011 |
| JP | 2014-220161 | A | 11/2014 |
| JP | 2014-535154 | A | 12/2014 |
| WO | 2009059462 | A1 | 5/2009 |
| WO | 2013071013 | A1 | 5/2013 |

* cited by examiner (a)

(b)

LIGHTING CONTROL DEVICE, LIGHTING SYSTEM, AND METHOD OF CONTROLLING LIGHTING DEVICE

CROSS REFERENCE TO RELATED APPLICATION

This application claims the benefit of priority of Japanese Patent Application Number 2015-198725 filed on Oct. 6, 2015, the entire content of which is hereby incorporated by reference.

BACKGROUND

1. Technical Field

The present disclosure relates to a lighting control device, a lighting system, and a method of controlling a lighting device, which control a lighting characteristic of a lighting device.

2. Description of the Related Art

The dimming, toning, or projection range, for example, of a lighting device may be controlled by operating, for example, a remote control. However, when a remote control is used, the user is burdened with having to, for example, search for the remote control and/or move to the location of the remote control. For this reason, there is a controller that controls the dimming, toning, or projection range, for example, of a lighting device in response to gestures made by a user. Japanese Unexamined Patent Application Publication (Translation of PCT Application) No. 2011-503789 discloses a technique related to such a controller.

SUMMARY

There is a demand to be able to intuitively control the size of the projection region illuminated by the lighting device by grabbing or touching the projection region illuminated by the lighting device by the palm of one's hand.

In light of this, the present disclosure has an object to provide a lighting control device, a lighting system, and a method of controlling a lighting device, which are capable of changing the size of the projection region illuminated by the lighting device in response to an intuitive gesture made by the user with respect to the projection region illuminated by the lighting device.

In one aspect, a lighting control device includes: a sensor that detects a state of a user and a gesture made by the user; and a controller that controls a lighting characteristic of a lighting device. The controller changes the size of a projection region illuminated by the lighting device in response to the sensor detecting a predetermined gesture involving both hands of the user made near a periphery of the projection region.

In one aspect, a lighting system includes the above-described lighting control device and the lighting device that is controlled by the lighting control device. The projection region illuminated by the lighting device is changeable in size.

In one aspect, a method of controlling a lighting device includes: changing a size of a projection region illuminated by the lighting device upon detecting a predetermined gesture involving both hands of a user made near a periphery of the projection region.

Accordingly, the lighting control device, the lighting system, and the method of controlling the lighting device are capable of changing the size of the projection region illuminated by the lighting device in response to an intuitive gesture made by the user with respect to the projection region illuminated by the lighting device.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENT

Hereinafter, an exemplary embodiment will be described in detail with reference to the accompanying drawings. The exemplary embodiment described below illustrates a preferred, specific example of the present disclosure. The shapes, elements, the arrangement and connection of the elements, etc., in the following exemplary embodiment are merely examples, and therefore are not intended to limit the inventive concept. Therefore, among the elements in the following exemplary embodiment, those not recited in any of the independent claims defining the most generic part of the inventive concept are described as optional elements belonging to a more preferred embodiment. Also note that the drawings are represented schematically and are not necessarily precise illustrations.

Embodiment

Hereinafter, an embodiment will be described in detail with reference to FIG. 1 through FIG. 11.

(Lighting System Configuration)

Figure 1:
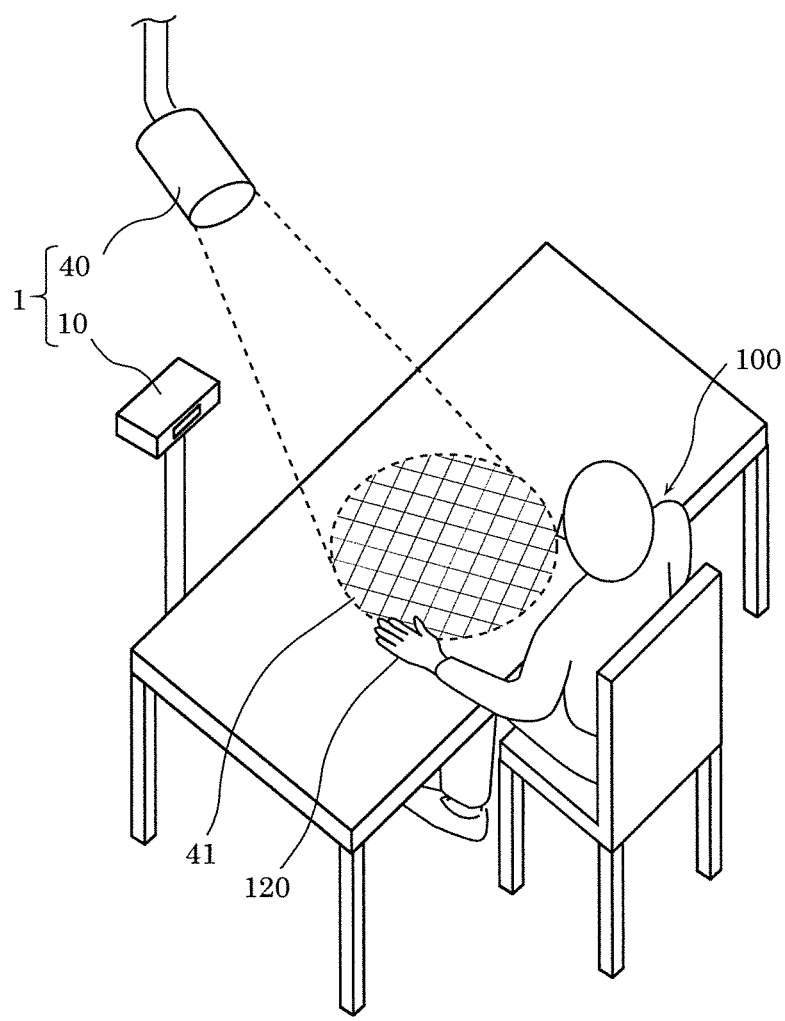
FIG. 1 illustrates an installation example of a lighting system according to an embodiment.

FIG. 1 illustrates an installation example of lighting system 1 according to an embodiment.

Lighting system 1 is a lighting system that controls a lighting characteristic of lighting device 40 in accordance with a state of user 100 and a gesture made by user 100, and is, for example, a lighting system used in an interior space (i.e., a room) of a building. Lighting system 1 includes lighting control device 10 and lighting device 40. Lighting control device 10 detects user 100 and controls lighting device 40 on the basis of the result of the detection of user 100, as illustrated in FIG. 1. Lighting control device 10 will be described in more detail with reference to FIG. 2 later. Lighting device 40 emits light whose lighting characteristics are controlled by lighting control device 10. Lighting device 40 will also be described in more detail with reference to FIG. 2 later. FIG. 1 illustrates projection region 41 of the light emitted by lighting device 40. Lighting device 40 illuminates a desk from above. Projection region 41 is formed on the desk.

Figure 2:
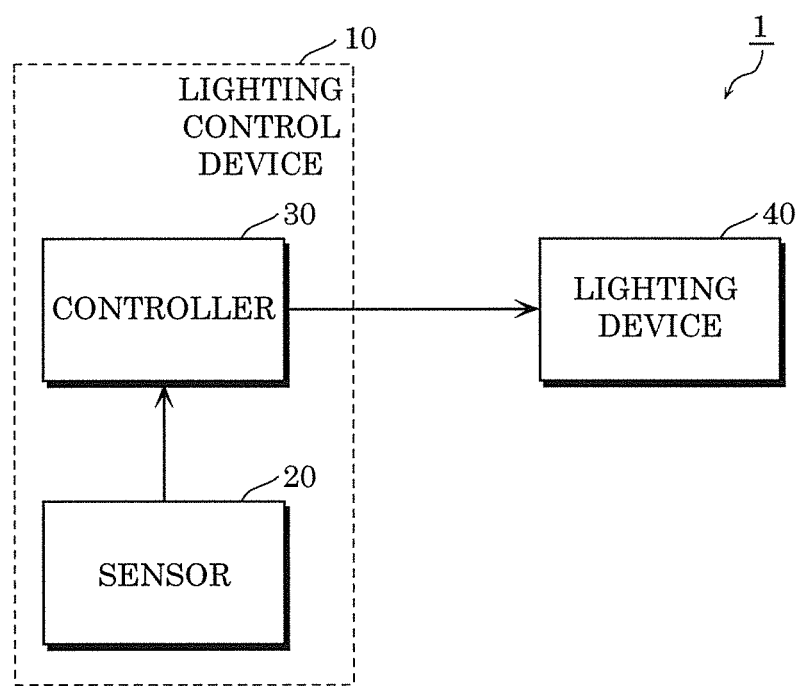
FIG. 2 is a configuration diagram of one example of a lighting system according to an embodiment.

FIG. 2 is a configuration diagram of one example of lighting system 1 according to an embodiment.

As is also illustrated in FIG. 1, lighting system 1 includes lighting control device 10 and lighting device 40.

Lighting control device 10 is a device for detecting user 100 and controlling lighting characteristics of lighting device 40, and includes sensor 20 and controller 30. The lighting characteristics of lighting device 40 controlled by lighting control device 10 include the emission or non-emission of light by lighting device 40, the position of projection region 41, the size of projection region 41, the brightness of projection region 41, and the color temperature of projection region 41.

Sensor 20 detects the state of user 100 and gestures made by user 100. Here, the state of user 100 is a given state of user 100, such as a state in which the palm of a hand of user 100 is open or a state in which the palm of a hand of user 100 is closed in a fist. Moreover, a gesture made by user 100 is a given gesture made by user 100, such as user 100 moving his or her right hand or user 100 making his or her hand into a fist. In other words, sensor 20 is capable of detecting both a given state of user 100 and a given gesture made by user 100.

Sensor 20 includes, for example, a camera. More specifically, the camera is an infrared camera. Sensor 20 includes, for example, an infrared light source (not illustrated in the drawings) and an infrared camera (not illustrated in the drawings). The infrared light source is a light source that spatially disperses and emits a plurality of infrared light rays, and projects a test pattern with infrared light. The infrared camera captures the test pattern reflected off an object (in this embodiment, the object is user 100). With this, the state of user 100 and gestures made by user 100 can be detected by detecting the shape and changes in the reflected test pattern. Sensor 20 further includes, for example, an illuminance sensor (not illustrated in the drawings). This makes it possible to detect the position of projection region 41 of lighting device 40. Note that sensor 20 is not limited to a sensor that includes an infrared light source, infrared camera, and an illuminance sensor; sensor 20 may be any sensor capable of detecting the three-dimensional form and movement of an object and brightness.

Controller 30 controls a lighting characteristic of lighting device 40. The lighting characteristics of lighting device 40 controlled by controller 30 include the emission or non-emission of light by lighting device 40, the position of projection region 41, the size of projection region 41, the brightness of projection region 41, and the color temperature of projection region 41. Controller 30 changes the size of projection region 41 in response to sensor 20 detecting a predetermined gesture involving both hands 120 of user 120 made near the periphery of projection region 41 of lighting device 40. Controller 30 will be described in more detail with reference to FIG. 5 and FIG. 8 later. Controller 30 determines whether a gesture made by user 100 and detected by sensor 20 matches a gesture indicated in information stored in a storage (not illustrated in the drawings) included in lighting control device 10. For example, controller 30 determines whether a gesture involving both hands 120 of user 100 made near the periphery of projection region 41 and detected by sensor 20 matches a gesture indicated in information stored in the storage in lighting control device 10. When controller 30 determines that a gesture made by user 100 and detected by sensor 20 matches a gesture indicated in information stored in the storage, controller 30 controls lighting device 40 in accordance with the information stored in the storage in lighting device 40. For example, when controller 30 determines that a gesture made by user 100 and detected by sensor 20 matches a gesture indicated by information associated with increasing the size of projection region 41, controller 30 causes lighting device 40 to increase the size of projection region 41.

Lighting device 40 is a lighting device controlled by lighting control device 10 and whose projection region 41 size is changeable. Lighting device 40 is controlled by lighting control device 10 by communicating with lighting control device 10 via a wired or wireless connection.

For example, lighting device 40 is set in advance to be capable of illuminating a region larger than projection region 41. Projection region 41 is set to a desired size and shape by adjusting the non-illuminated region of the larger region. This makes it possible to change the size and shape of projection region 41. In this embodiment, the shape of projection region 41 is either a circular shape or an annular shape, but by adjusting the non-illuminated region, the shape of projection region 41 can be adjusted to be, for example, a quadrangular or other shape. The non-illuminated region may be adjusted with, for example, a physical mask that prevents light from being incident in regions other than projection region 41. Alternatively, the non-illuminated region may be adjusted by causing the light-emitting elements corresponding to regions other than projection region 41 to not emit light.

Lighting device 40 is a lighting device whose brightness and color temperature is changeable. Dimming is performed as a result of controller 30 changing the dimming ratio by adjusting the light output of the light source included in lighting device 40. Moreover, for example, lighting device 40 includes a plurality of light sources that include a blue light LED and a yellow phosphor, and emit light of mutually different color temperatures, and the color tone is adjusted as a result of controller 30 adjusting the light output ratio of each light source to alter the color temperature of light output by lighting device 40. Note that lighting device 40 may include, for example, a light source including a red light LED, green light LED, and blue light LED, and the color tone may be adjusted as a result of controller 30 adjusting the light output ratios of the red light LED, green light LED, and blue light LED to alter the color temperature of the light output by lighting device 40. Alternatively, lighting device 40 may include a plurality of light sources including a near ultraviolet LED and an RGB phosphor, and the color tone may be adjusted as a result of controller 30 adjusting the light output ratio of each light source to alter the color temperature of light output by lighting device 40. In other words, lighting device 40 may be any lighting device whose color temperature is changeable.

(Operations for Turning On and Off Lighting Device and Changing the Projection Region Position)

Next, among operations performed by lighting control device 10, operations for turning on and off lighting device 40 and changing the position of projection region 41 will be described with reference to FIG. 3 and FIG. 4.

Figure 3:
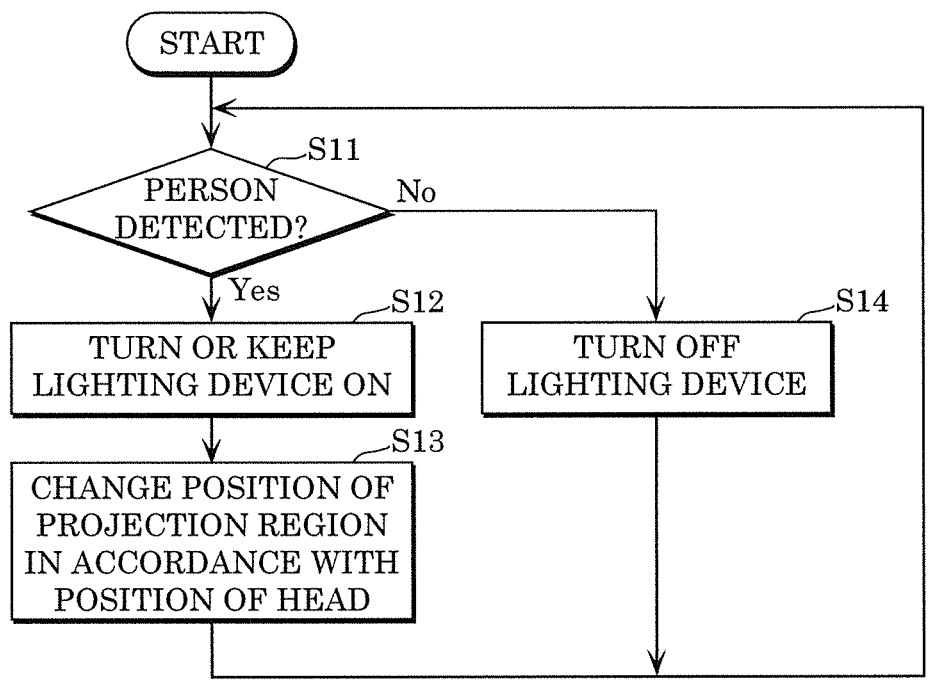
FIG. 3 is a flow chart illustrating an example of operations for turning on and off a lighting control device according to an embodiment, and adjusting the position of a projection region.

FIG. 3 is a flow chart illustrating an example of operations for turning on and off lighting control device 10 according to an embodiment, and adjusting the position of projection region 41.

First, controller 30 determines whether or not sensor 20 has detected user 100 in a given range (step S11). A given range is, as illustrated in FIG. 1, a range around a desk, and controller 30 determines whether or not sensor 20 has detected user 100 in a range around the desk.

When controller 30 determines that sensor 20 has detected user 100 in the given range (yes in step S11), controller 30 either turns on or maintains the on state of lighting device 40 (step S12). More specifically, if lighting device 40 is off, controller 30 turns lighting device 40 on, and if lighting device 40 is on, controller 30 keeps lighting device 40 on.

Next, controller 30 changes the position of projection region 41 in accordance with the position of the head of user 100 detected by sensor 20 (step S13). For example, controller 30 controls lighting device 40 so as to cause lighting device 40 to project projection region 41 in front of the position of the head of user 100. Next, the processing involved in step S13 will be described in detail with reference to FIG. 4.

Figure 4:
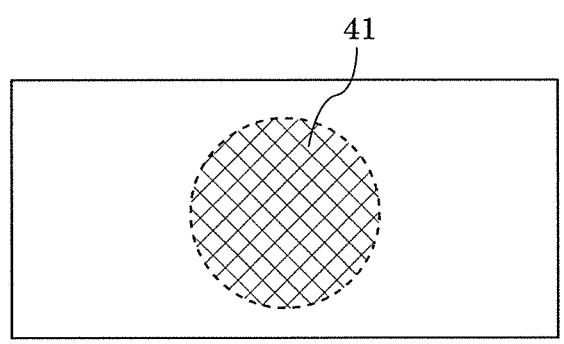
FIG. 4 is for illustrating operations for changing the position of a projection region performed by a lighting control device according to an embodiment.
Figure 4:
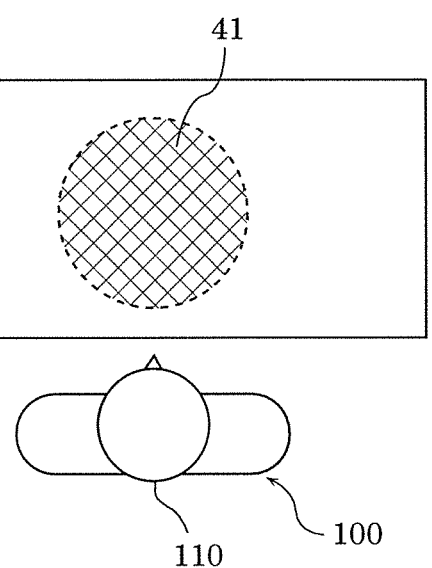
Figure 4:
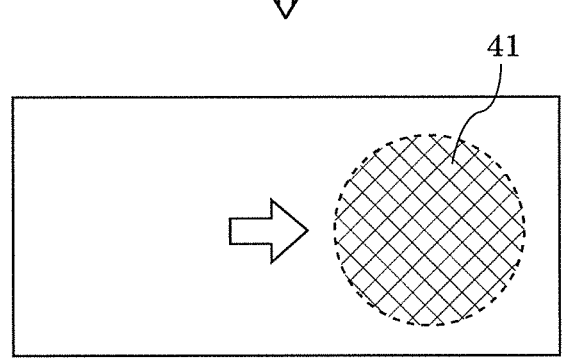
Figure 4:
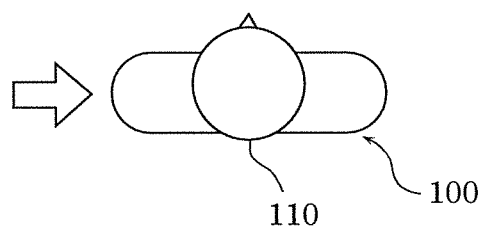

FIG. 4 is for illustrating operations for changing the position of projection region 41 of lighting device 40 performed by lighting control device 10 according to an embodiment.

As illustrated in (a) in FIG. 4, projection region 41 is located in front of head 110 of user 100. As illustrated in (b) in FIG. 4, when user 100 moves from the state illustrated in (a) in FIG. 4, head 110 moves along with user 100. Here when sensor 20 detects a change in the position of head 110, controller 30 moves the position of projection region 41 to a position in front of head 110 (i.e., to a position directly in front of user 100) in accordance with the position of head 110 of user 100 detected by sensor 20.

On the other hand, when controller 30 determines that sensor 20 has not detected user 100 in the given range (no in step S11), controller 30 turns off lighting device 40 (step S14).

Thus, lighting device 40 is on when user 100 is in the given range (for example, in front of a desk), and lighting device 40 is off when user 100 is not in the given range. Moreover, when user 100 is in the given range, the position of projection region 41 is changed in accordance with the position of head 110 of user 100.

(Operations for Changing Projection Region Size)

Next, among operations performed by lighting control device 10 for controlling lighting characteristics of lighting device 40, operations for changing the size of projection region 41 will be described with reference to FIG. 5 through FIG. 8

Figure 5:
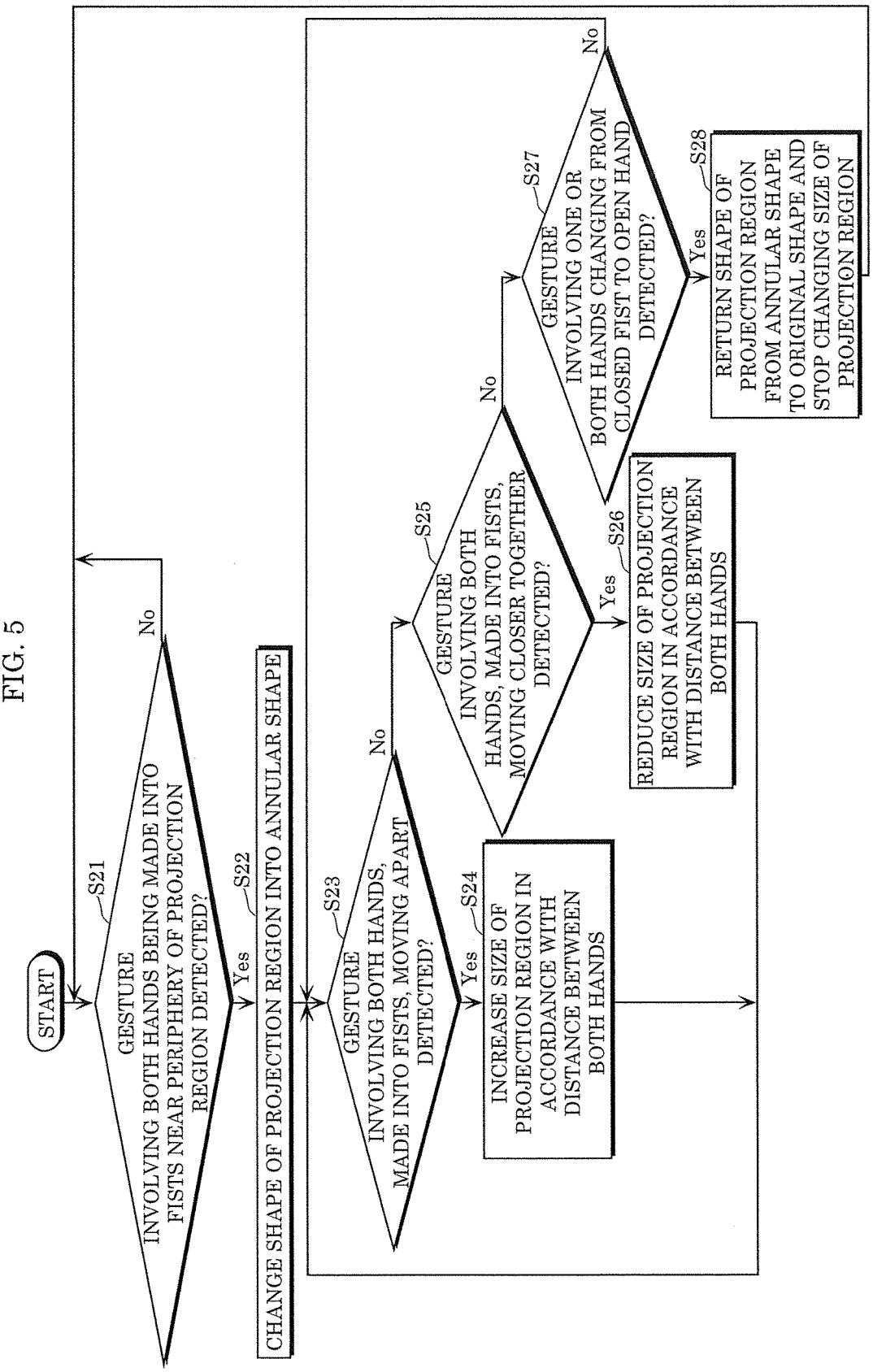
FIG. 5 is a flow chart illustrating an example of operations for changing the size of a projection region illuminated by a lighting device performed by a lighting control device according to an embodiment.

FIG. 5 is a flow chart illustrating an example of operations for changing the size of projection region 41 of lighting device 40 performed by lighting control device 10 according to an embodiment.

First, controller 30 determines whether or not sensor 20 has detected a gesture involving both hands 120 being made into fists near the periphery of projection region 41 of lighting device 40 (step S21). Here, "near" the periphery of projection region 41 means within a region between a boundary 30% larger than the periphery of projection region 41 and a boundary 30% smaller than the periphery of projection region 41. When projection region 41 is circular in shape, "boundary" means "diameter", and when projection region 41 is quadrangular in shape, "boundary" means the length of one side.

When controller 30 determines that sensor 20 has not detected a gesture involving both hands 120 being made into fists near the periphery of projection region 41 of lighting device 40 (no in step S21), controller 30 repeats step S21 until sensor 20 detects a gesture involving both hands 120 being made into fists near the periphery of projection region 41 of lighting device 40.

When controller 30 determines that sensor 20 has detected a gesture involving both hands 120 being made into fists near the periphery of projection region 41 of lighting device 40 (yes in step S21), controller 30 causes lighting device 40 to change the shape of projection region 41 to an annular shape (step S22). Next, the processing involved in steps S21 and S22 will be described in detail with reference to FIG. 6.

Figure 6:
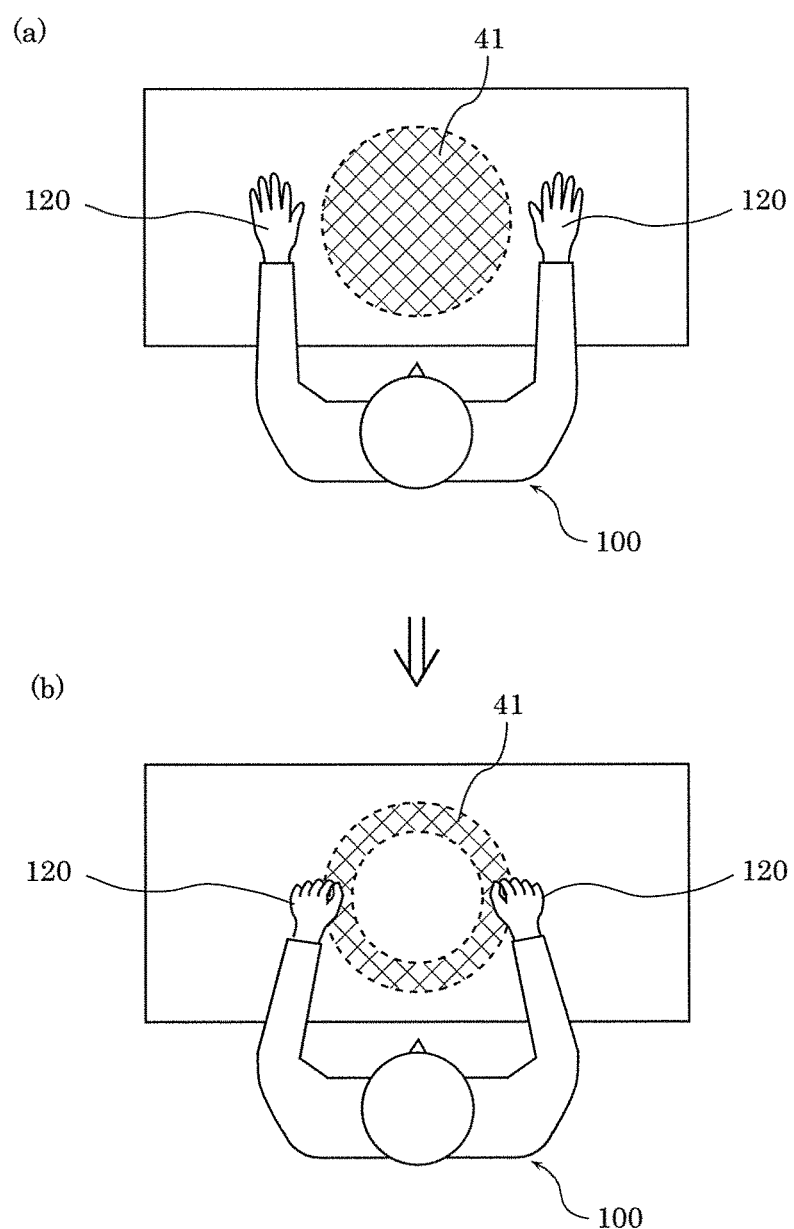
FIG. 6 is for illustrating operations for changing the shape of a projection region illuminated by a lighting device into an annular shape performed by a lighting control device according to an embodiment.

FIG. 6 is for illustrating operations for changing the shape of projection region 41 of lighting device 40 into an annular shape performed by lighting control device 10 according to an embodiment.

As illustrated in (a) in FIG. 6, projection region 41 is usually circular. Here, the palms of both hands 120 of user 100 are open. Then, as illustrated in (b) in FIG. 6, as a result of user 100 making both hands 120 into fists near the periphery of projection region 41, sensor 20 detects a gesture involving both hands 120 being made into fists near the periphery of projection region 41 of lighting device 40. In response, controller 30 causes lighting device 40 to change the shape of projection region 41 to an annular shape. For example, since the shape of projection region 41 is originally circular, the shape of projection region 41 is changed to a circular ring. Note that when the shape of projection region 41 is originally quadrangular, the shape of projection region 41 may be changed to a quadrangular ring.

In this way, the shape of projection region 41 is changed.

Next, controller 30 determines whether or not sensor 20 has detected a gesture involving both hands 120, made into fists, moving apart (step S23). In other words, controller 30 determines whether or not sensor 20 has detected (i) that both hands 120 are made into fists and, further, (ii) a gesture involving both hands 120, made into fists, moving apart.

When controller 30 determines that sensor 20 has detected a gesture involving both hands 120, made into fists, moving apart (yes in step S23), controller 30 increases the size of projection region 41 in accordance with the distance between both hands 120 (step S24). With this, user 100 can move both hands 120 apart while both hands 120 are made into fists near the periphery of projection region 41 to increase the size of projection region 41. Then, step S23 is performed again.

On the other hand, when controller 30 determines that sensor 20 has not detected a gesture involving both hands 120, made into fists, moving apart (no in step S23), controller 30 determines whether or not sensor 20 has detected a gesture involving both hands 120, made into fists, moving closer together (step S25). In other words, controller 30 determines whether or not sensor 20 has detected (i) that both hands 120 are made into fists and, further, (ii) a gesture involving both hands 120, made into fists, moving closer together.

When controller 30 determines that sensor 20 has detected a gesture involving both hands 120, made into fists, moving closer together (yes in step S25), controller 30 reduces the size of projection region 41 in accordance with the distance between both hands 120 (step S26). With this, user 100 can move both hands 120 closer together while both hands 120 are made into fists near the periphery of projection region 41 to reduce the size of projection region 41. Then, step S23 is performed again.

In this way, in step S24 or step S26, the size of projection region 41 can be changed to a size desired by user 100 in accordance with the distance between both hands 120.

On the other hand, when controller 30 determines that sensor 20 has not detected a gesture involving both hands 120, made into fists, moving closer together (no in step S25), controller 30 determines whether or not sensor 20 has detected a gesture involving one hand or both hands 120 of user 100 changing from a closed fist to an open hand (step S27). Step S27 is performed when the distance between both hands 120 is neither increased nor decreased.

When controller 30 determines that sensor 20 has detected a gesture involving one hand or both hands 120 of user 100 changing from a closed fist to an open hand (yes in step S27), controller 30 returns the shape of projection region 41 from the annular shape to the original shape, and stops changing the size of projection region 41 (step S28). Then, the processing returns to step S21.

When controller 30 determines that sensor 20 has not detected a gesture involving one hand or both hands 120 of user 100 changing from a closed fist to an open hand (no in step S27), step S23 is performed again.

In this way, the size of projection region 41 is fixed to the size changed to in step S24 or S26. In other words, lighting control device 10 is in a "projection region 41 change" mode until user 100 opens one or both hands 120, and stops changing the size of projection region 41 in accordance with the distance between both hands 120 ultimately decided on by user 100 as indicated by user 100 opening one or both hands 120.

Next, operations for increasing the size of projection region 41 in steps S23 and S24, and operations for fixing the size of projection region 41 in steps S27 and S28 will be described with reference to FIG. 7.

Figure 7:
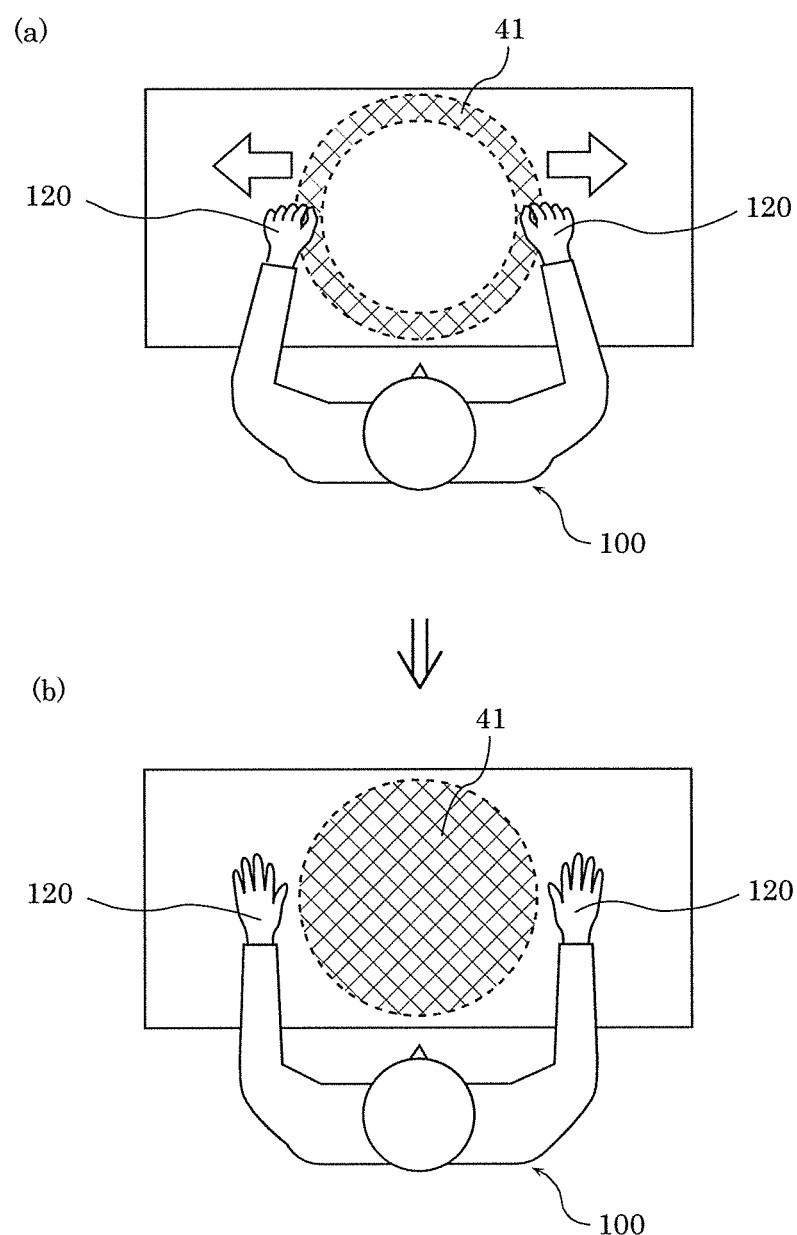
FIG. 7 is for illustrating operations for increasing the size of projection region illuminated by a lighting device performed by a lighting control device according to an embodiment.

FIG. 7 is for illustrating operations for increasing the size of projection region 41 of lighting device 40 performed by lighting control device 10 according to an embodiment.

FIG. 7 illustrates, in (a), a state in which the size of the annular projection region 41 illustrated in (b) in FIG. 6 has been increased. User 100 increases the distance between both hands 120 illustrated in (b) in FIG. 6 by holding projection region 41 with both hands 120 near the periphery of projection region 41 and then moving both hands 120 apart, as illustrated in (a) in FIG. 7. This increases the size of the annular projection region 41. Then, as illustrated in (b) in FIG. 7, as a result of user 100 opening the palms of both hands 120, the size of projection region 41 is fixed to the size illustrated in (a) in FIG. 7.

Next, operations for reducing the size of projection region 41 in steps S25 and S26, and operations for fixing the size of projection region 41 in steps S27 and S28 will be described with reference to FIG. 8.

Figure 8:
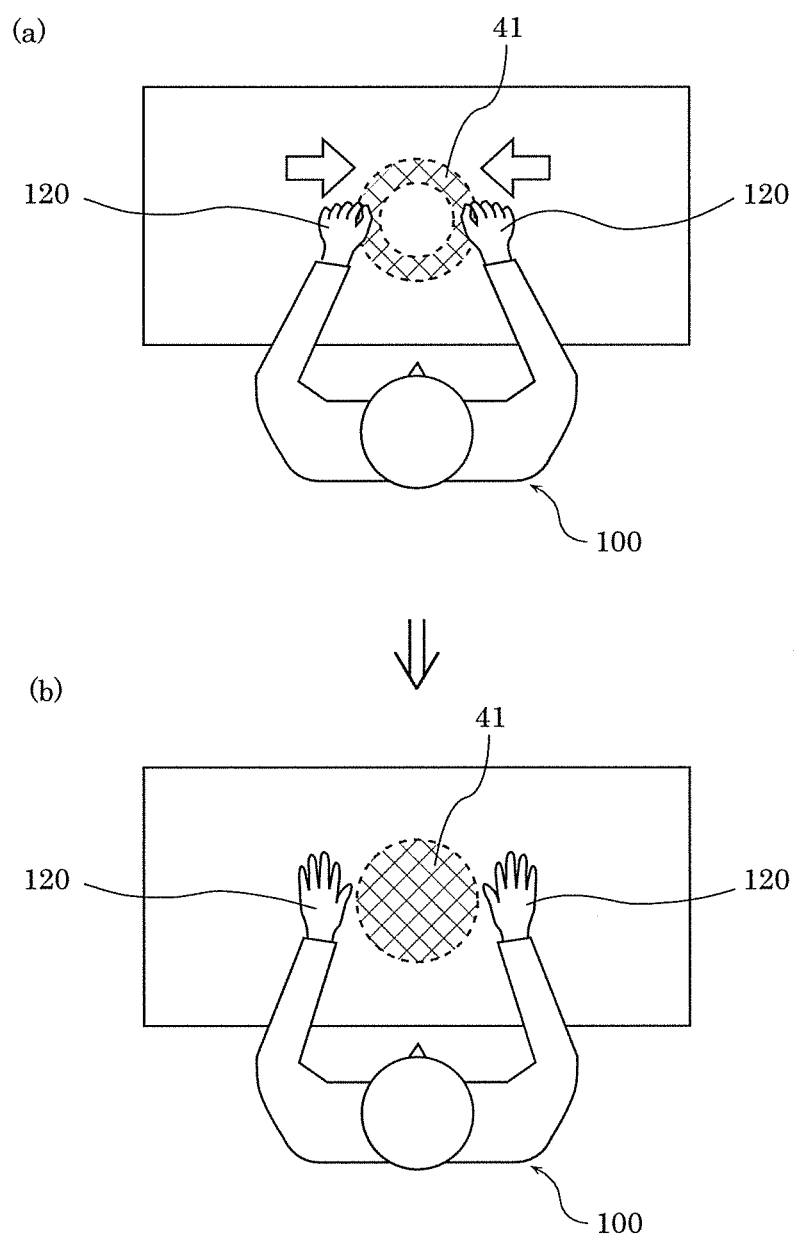
FIG. 8 is for illustrating operations for reducing the size of a projection region illuminated by a lighting device performed by a lighting control device according to an embodiment.

FIG. 8 is for illustrating operations for reducing the size of projection region 41 of lighting device 40 performed by lighting control device 10 according to an embodiment.

FIG. 8 illustrates, in (a), a state in which the size of the annular projection region 41 illustrated in (b) in FIG. 6 has been reduced. User 100 reduces the distance between both hands 120 illustrated in (b) in FIG. 6 by holding projection region 41 with both hands 120 near the periphery of projection region 41 and then moving both hands 120 closer together, as illustrated in (a) in FIG. 8. This reduces the size of the annular projection region 41. Then, as illustrated in (b) in FIG. 8, as a result of user 100 opening the palms of both hands 120, the size of projection region 41 is fixed to the size illustrated in (a) in FIG. 8.

In this way, controller 30 changes the shape of projection region 41 into an annular shape in response to sensor 20 detecting a gesture involving both hands 120 being made into fists near the periphery of projection region 41 of lighting device 40. Then, controller 30 changes the size of the annular projection region 41 in response to sensor 20 detecting a gesture involving a change in distance between both hands 120 while both hands 120 are made into fists. More specifically, controller 30 increases the size of projection region 41 in response to sensor 20 detecting a gesture involving both hands 120 holding projection region 41 near the periphery of projection region 41 and then moving apart, and reduces the size of projection region 41 in response to sensor 20 detecting a gesture involving both hands 120 holding projection region 41 near the periphery of projection region 41 and then moving closer together. Then, controller 30 stops changing the size of projection region 41 in response to sensor 20 detecting a gesture involving one hand or both hands 120 of user 100 changing from a closed fist to an open hand.

(Operations for Changing Brightness or Color Temperature)

Next, among operations performed by lighting control device 10 for controlling lighting characteristics of lighting device 40, operations for changing the brightness or color temperature of lighting device 40 will be described with reference to FIG. 9 through FIG. 11.

First, operations for changing the brightness of lighting device 40 performed by lighting control device 10 will be described with reference to FIG. 9.

Figure 9:
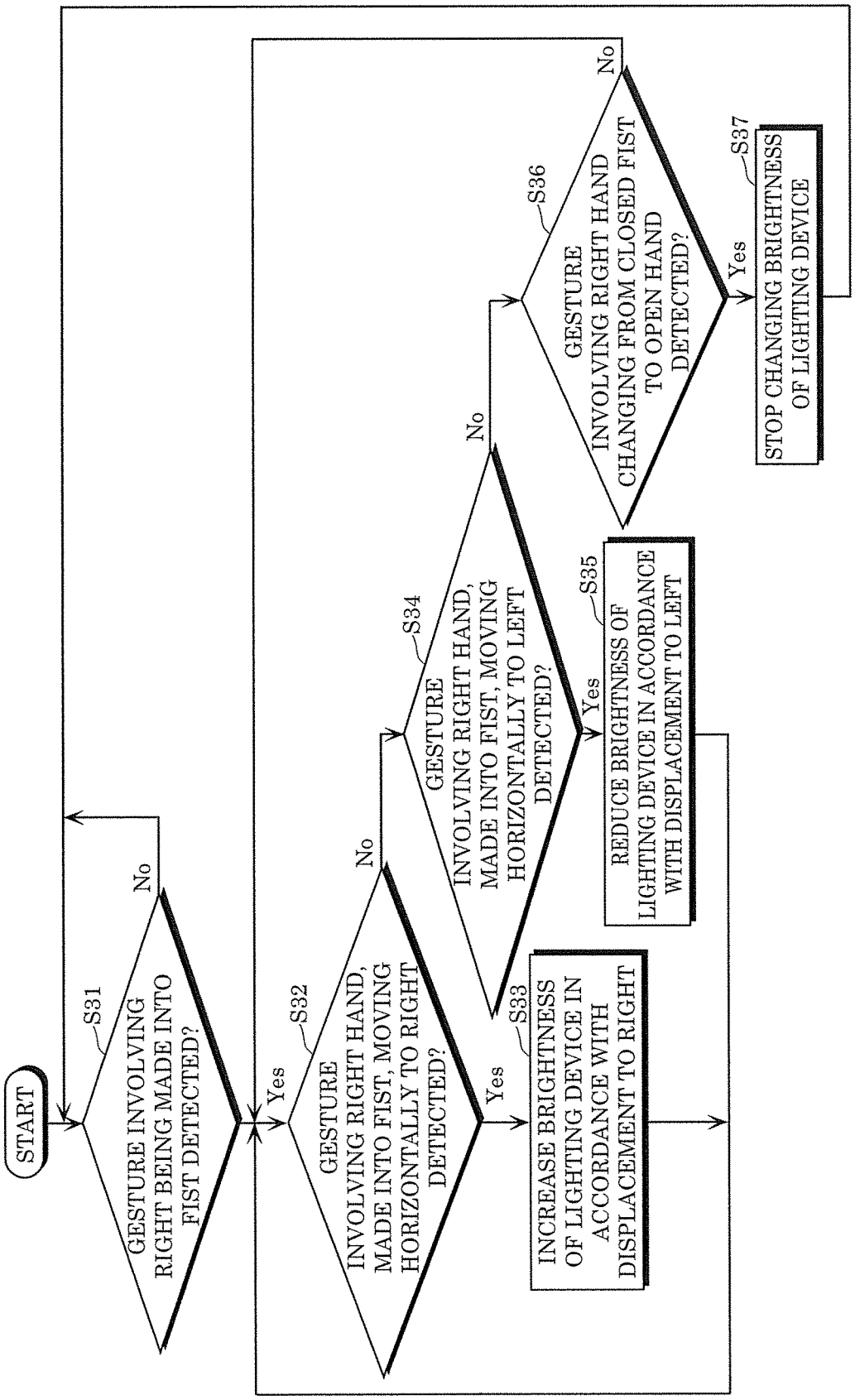
FIG. 9 is a flow chart illustrating an example of operations for changing the brightness of a lighting device performed by a lighting control device according to an embodiment.

FIG. 9 is a flow chart illustrating an example of operations for changing the brightness of lighting device 40 performed by lighting control device 10 according to an embodiment.

First, controller 30 determines whether or not sensor 20 has detected a gesture involving right hand 120a being made into a fist (step S31). Here, controller 30 determines whether or not sensor 20 has detected a gesture involving right hand 120a being made into a fist, for example, inside projection region 41.

When controller 30 determines that sensor 20 has not detected a gesture involving right hand 120a being made into a fist inside projection region 41 (no in step S31), controller 30 repeats step S31 until sensor 20 detects a gesture involving right hand 120a being made into a fist inside projection region 41.

When controller 30 determines that sensor 20 has detected a gesture involving right hand 120a being made into a fist inside projection region 41 (yes in step S31), controller 30 determines whether or not sensor 20 has detected a gesture involving right hand 120a, made into a fist, moving horizontally to the right (step S32). In other words, controller 30 determines whether or not sensor 20 has detected (i) that right hand 120a is made into a fist and, further, (ii) a gesture involving right hand 120a, made into a fist, moving horizontally to the right. Here, "right" is, for example, from the perspective of user 100.

When controller 30 determines that sensor 20 has detected a gesture involving right hand 120a, made into a fist, moving horizontally to the right (yes in step S32), controller 30 increases the brightness of lighting device 40 in accordance with the amount of displacement of right hand 120a to the right (step S33). With this, user 100 can increase the brightness of lighting device 40 by moving right hand 120a, made into a fist, to the right inside projection region 41. Then, step S32 is performed again.

On the other hand, when controller 30 determines that sensor 20 has not detected a gesture involving right hand 120a, made into a fist, moving horizontally to the right (no in step S32), controller 30 determines whether or not sensor 20 has detected a gesture involving right hand 120a, made into a fist, moving horizontally to the left (step S34). In other words, controller 30 determines whether or not sensor 20 has detected (i) that right hand 120a is made into a fist and, further, (ii) a gesture involving right hand 120a, made into a fist, moving horizontally to the left.

When controller 30 determines that sensor 20 has detected a gesture involving right hand 120a, made into a fist, moving horizontally to the left (yes in step S34), controller 30 reduces the brightness of lighting device 40 in accordance with the amount of displacement of right hand 120a to the left (step S35). With this, user 100 can reduce the brightness of lighting device 40 by moving right hand 120a, made into a fist, to the left inside projection region 41. Then, step S32 is performed again.

In this way, in step S33 or step S35, the brightness of lighting device 40 can be changed to a level desired by user 100 in accordance with the amount of displacement of right hand 120a in a horizontal direction.

On the other hand, when controller 30 determines that sensor 20 has not detected a gesture involving right hand 120a, made into a fist, moving horizontally to the left (no in step S34), controller 30 determines whether or not sensor 20 has detected a gesture involving right hand 120a of user 100 changing from a closed fist to an open hand (step S36). Step S26 is performed when right hand 120a is not moved horizontally.

When controller 30 determines that sensor 20 has detected a gesture involving right hand 120a of user 100 changing from a closed fist to an open hand (yes in step S36), controller 30 stops changing the brightness of lighting device 40 (step S37). Then, the processing returns to step S31.

In this way, the brightness of lighting device 40 is fixed to the brightness changed to in step S33 or S35. In other words, lighting control device 10 is in a "lighting device 40 brightness change" mode until user 100 opens the palm of right hand 120a, and stops changing the brightness of lighting device 40 in accordance with the amount of horizontal displacement of right hand 120a ultimately decided on by user 100 as indicated by user 100 opening the palm of right hand 120a.

Next, operations for changing the color temperature of lighting device 40 performed by lighting control device 10 will be described with reference to FIG. 10.

Figure 10:
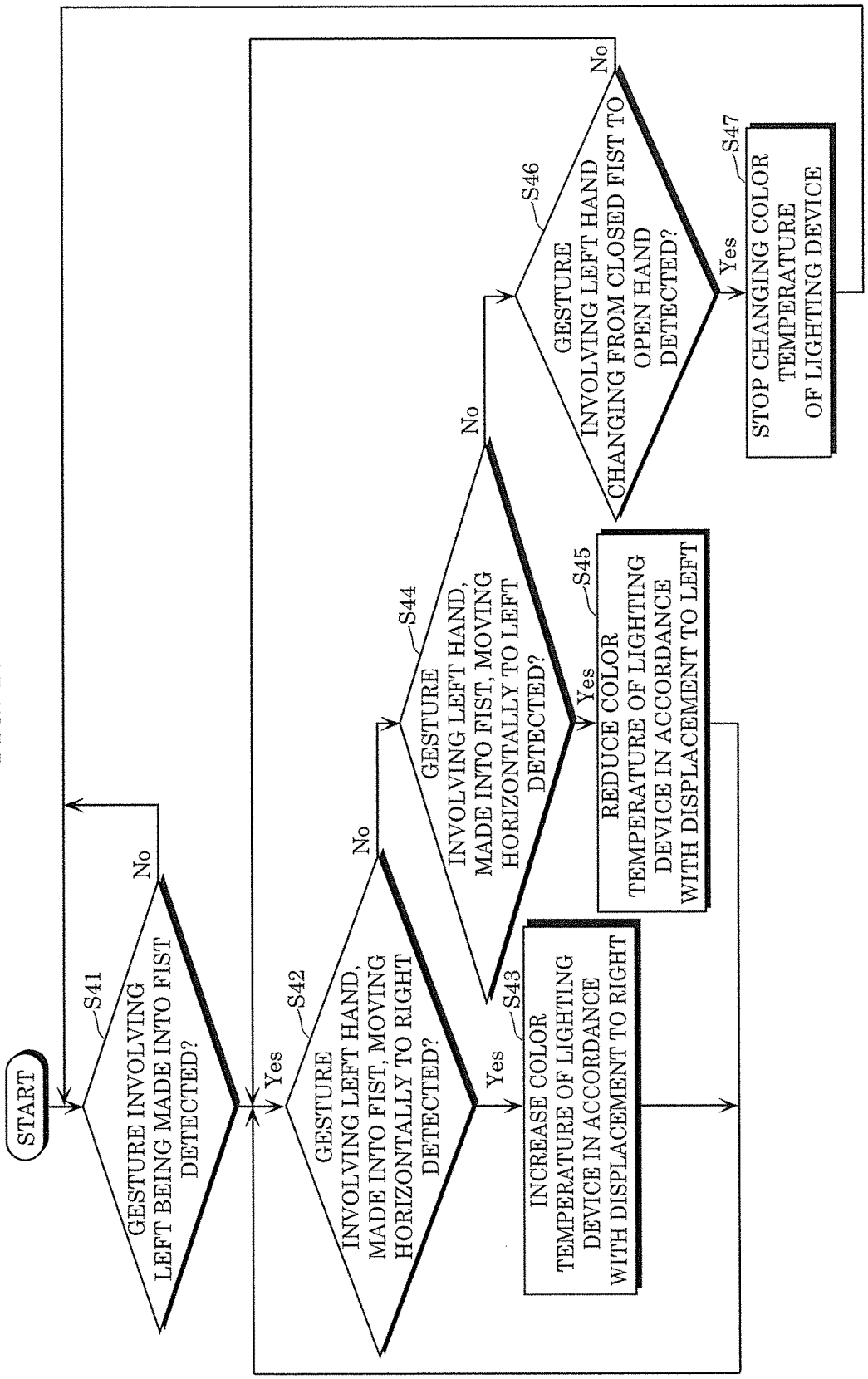
FIG. 10 is a flow chart illustrating an example of operations for changing the color temperature of a lighting device performed by a lighting control device according to an embodiment.

FIG. 10 is a flow chart illustrating an example of operations for changing the color temperature of lighting device 40 performed by lighting control device 10 according to an embodiment.

First, controller 30 determines whether or not sensor 20 has detected a gesture involving left hand 120b being made into a fist (step S41). Here, controller 30 determines whether or not sensor 20 has detected a gesture involving left hand 120b being made into a fist, for example, inside projection region 41.

When controller 30 determines that sensor 20 has not detected a gesture, involving left hand 120b being made into a fist inside projection region 41 (no in step S41), controller 30 repeats step S41 until sensor 20 detects a gesture involving left hand 120b being made into a fist inside projection region 41.

When controller 30 determines that sensor 20 has detected a gesture involving left hand 120b being made into a fist inside projection region 41 (yes in step S41), controller 30 determines whether or not sensor 20 has detected a gesture involving left hand 120b, made into a fist, moving horizontally to the right (step S42). In other words, controller 30 determines whether or not sensor 20 has detected (i) that left hand 120b is made into a fist and, further, (ii) a gesture involving left hand 120b, made into a fist, moving horizontally to the right. Here, "right" is, for example, from the perspective of user 100.

When controller 30 determines that sensor 20 has detected a gesture involving left hand 120b, made into a fist, moving horizontally to the right (yes in step S42), controller 30 increases the color temperature of lighting device 40 in accordance with the amount of displacement of left hand 120b to the right (step S43). With this, user 100 can increase the color temperature of lighting device 40 by moving left hand 120b, made into a fist, to the right inside projection region 41. Then, step S42 is performed again.

On the other hand, when controller 30 determines that sensor 20 has not detected a gesture involving left hand 120b, made into a fist, moving horizontally to the right (no in step S42), controller 30 determines whether or not sensor 20 has detected a gesture involving left hand 120b, made into a fist, moving horizontally to the left (step S44). In other words, controller 30 determines whether or not sensor 20 has detected (i) that left hand 120b is made into a fist and, further, (ii) a gesture involving left hand 120b, made into a fist, moving horizontally to the left.

When controller 30 determines that sensor 20 has detected a gesture involving left hand 120b, made into a fist, moving horizontally to the left (yes in step S44), controller 30 reduces the color temperature of lighting device 40 in accordance with the amount of displacement of left hand 120b to the left (step S45). With this, user 100 can reduce the color temperature of lighting device 40 by moving left hand 120b, made into a fist, to the left inside projection region 41. Then, step S42 is performed again.

In this way, in step S43 or step S45, the color temperature of lighting device 40 can be changed to level desired by user 100 in accordance with the amount of displacement of left hand 120b in a horizontal direction.

On the other hand, when controller 30 determines that sensor 20 has not detected a gesture involving left hand 120b, made into a fist, moving horizontally to the left (no in step S44), controller 30 determines whether or not sensor 20 has detected a gesture involving left hand 120b of user 100 changing from a closed fist to an open hand (step S46). Step S46 is performed when left hand 120b is not moved horizontally.

When controller 30 determines that sensor 20 has detected a gesture involving left hand 120b of user 100 changing from a closed fist to an open hand (yes in step S46), controller 30 stops changing the color temperature of lighting device 40 (step S47). The processing then returns to step S41.

In this way, the color temperature of lighting device 40 is fixed to the color temperature changed to in step S43 or S45. In other words, lighting control device 10 is in a "lighting device 40 color temperature change" mode until user 100 opens the palm of left hand 120b, and stops changing the color temperature of lighting device 40 in accordance with the amount of horizontal displacement of left hand 120b ultimately decided on by user 100 as indicated by user 100 opening the palm of left hand 120b.

Next, operations for changing the brightness of lighting device 40 in step S33 or S35 will be described with reference to FIG. 11.

Figure 11:
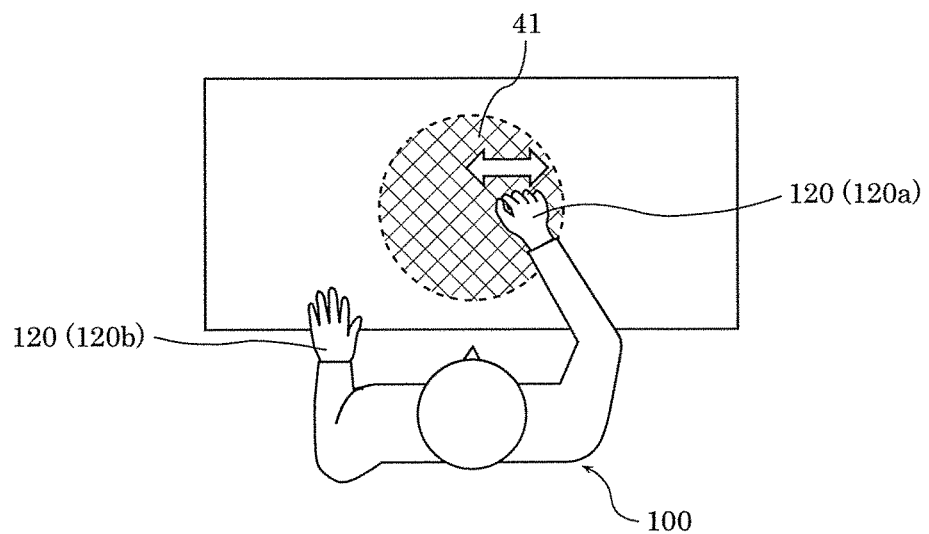
FIG. 11 is for illustrating operations for changing the brightness of a lighting device performed by a lighting control device according to an embodiment.

FIG. 11 is for illustrating operations for changing the brightness of lighting device 40 performed by lighting control device 10 according to an embodiment. FIG. 11 illustrates right hand 120a, made into a fist, being moved horizontally in a side-to-side direction inside projection region 41.

As illustrated in FIG. 11, the brightness of lighting device 40 can be changed by moving right hand 120a, made into a fist, in left or right in a horizontal direction inside projection region 41. Although not illustrated in the drawings, note that the color temperature of lighting device 40 can be changed by moving left hand 120b, made into a fist, in left or right in a horizontal direction inside projection region 41, similar to FIG. 11.

In this way, controller 30 changes the brightness or color temperature of lighting device 40 in response to sensor 20 detecting a predetermined gesture involving one hand (right hand 120a or left hand 120b) of user 100. More specifically, controller 30 changes the brightness or color temperature of lighting device 40 in response to sensor 20 detecting a gesture involving one hand (right hand 120a or left hand 120b) made into a fist. Even more specifically, controller 30 changes the brightness or color temperature of lighting device 40 in response to sensor 20 detecting a gesture involving one hand (right hand 120a or left hand 120b), made into a fist, moving in a horizontal direction.

(Advantageous Effects, etc.)

There is a demand to be able to intuitively control the size of the projection region illuminated by a lighting device by grabbing or touching the projection region illuminated by the lighting device by the palm of one's hand.

In light of this, lighting control device 10 includes sensor 20 that detects a state of user 100 and a gesture made by user 100, and controller 30 that controls a lighting characteristic of lighting device 40. Controller 30 changes the size of projection region 41 in response to sensor 20 detecting a predetermined gesture involving both hands 120 of user 100 made near the periphery of projection region 41 of lighting device 40.

Moreover, lighting system 1 according to this embodiment includes lighting control device 10 and lighting device 40 that is controlled by lighting control device 10. Projection region 41 of lighting device 40 is changeable in size.

Moreover, a method of controlling lighting device 40 includes: changing a size of projection region 41 illuminated by lighting device 40 upon detecting a predetermined gesture involving both hands 120 of user 110 made near a periphery of projection region 41.

This makes it possible to change the size of projection region 41 of lighting device 40 in response to an intuitive gesture made by user 100 with respect to projection region 41 of lighting device 40. In other words, changing the size of projection region 41 by moving both hands 120 near the periphery of projection region 41 gives user 100 the sensation of, for example, directly grabbing or touching projection region 41.

Controller 30 changes the size of projection region 41 in response to sensor 20 detecting a gesture involving a change in distance between both hands 120.

Change the size of projection region 41 by changing the distance between both hands 120 gives user 100 the sensation of compressing or stretching projection region 41.

When controller 30 changes the size of projection region 41, controller 30 changes the shape of projection region 41 to an annular shape.

Changing the shape of projection region 41 to an annular shape allows user 100 to recognize that lighting control device 10 is in a mode for changing the size of projection region 41.

Controller 30 changes the shape of projection region 41 into an annular shape in response to sensor 20 detecting a gesture involving both hands 120 being made into fists near the periphery of projection region 41 of lighting device 40. Controller 30 changes the size of the annular projection region 41 in response to sensor 20 detecting a gesture involving a change in distance between both hands 120 while both hands 120 are made into fists.

This gives user 100 the sensation of grabbing projection region 41 since the shape of projection region 41 changes to an annular shape in response to user 100 closing both hands into fists near the periphery of projection region 41. Moreover, changing the size of projection region 41 by changing the distance between both hands 120 while both hands 120 are made into fists gives user 100 the sensation of compressing or stretching projection region 41 while grabbing projection region 41.

More specifically, controller 30 increases the size of projection region 41 in response to sensor 20 detecting a gesture involving both hands 120 holding projection region 41 near the periphery of projection region 41 and then moving apart, and reduces the size of projection region 41 in response to sensor 20 detecting a gesture involving both hands 120 holding projection region 41 near the periphery of projection region 41 and then moving closer together.

This gives user 100 the sensation of holding projection region 41 between both hands 120 and compressing projection region 41 when reducing the size of projection region 41, and gives user 100 the sensation of holding projection region 41 between both hands 120 and stretching projection region 41 when increasing the size of projection region 41.

Controller 30 stops changing the size of projection region 41 in response to sensor 20 detecting a gesture involving one hand (right hand 120a or left hand 120b) or both hands 120 of user 100 changing from a closed fist to an open hand.

This gives user 100 a sense of releasing the grabbed projection region 41 when fixing the size of projection region 41.

Controller 30 changes the brightness or color temperature of lighting device 40 in response to sensor 20 detecting a predetermined gesture involving one hand (right hand 120a or left hand 120b) of user 100.

This makes it possible to easily change the brightness or color temperature of lighting device 40 via a one-handed gesture made by user 100.

Controller 30 changes the brightness or color temperature of lighting device 40 in response to sensor 20 detecting a gesture involving one hand 120a (or 120b) while one hand 120a (or 120b) is made into a fist.

This makes it possible to easily change the brightness or color temperature of lighting device 40 via a gesture made by user 100 involving one hand made into a fist.

Controller 30 changes the brightness or color temperature of lighting device 40 in response to sensor 20 detecting a gesture involving one hand 120a (or 120b) moving horizontally while one hand 120a (or 120b) is made into a fist.

This makes it possible to easily change the brightness or color temperature of lighting device 40 by user 100 moving one hand, made into a fist, horizontally.

Controller 30 changes the position of projection region 41 in accordance with the position of head 110 of user 100 detected by sensor 20.

Even when the position of user 100 changes, this makes it possible to cause the position of projection region 41 to track to a position in front of head 110 of user 100 (i.e., to a position directly in front of user 100). More specifically, for example, even when user 100 moves one body width to the left or right while sitting in a chair and reading a book at a desk, the position of projection region 41 tracks to the position of head 110, allowing user 100 to read the book with the location of illumination being directly in front user 100.

Controller 30 turns off lighting device 40 when sensor 20 does not detect user 100 in a given range.

This makes it possible to automatically turn off lighting device 40, without requiring user 100 to manually turn off lighting device 40, when user 100 moves out of the given range.

Moreover, sensor 20 includes a camera. The camera is an infrared camera.

This makes it possible for sensor 20 to easily detect a state of and a gesture made by user 100.

Moreover, projection region 41 is formed on a desk, and lighting device 40 illuminates the desk from above.

This makes it possible for user 100 to change the size of projection region 41 by making a direct gesture with respect to projection region 41 formed on the desk by lighting device 40 when user 100 is reading or performing a task at the desk.

Other Embodiments

Lighting control device 10 and lighting system 1 have hereinbefore been described according to an exemplary embodiment, but the techniques of the present disclosure are not limited to this embodiment.

For example, in the above embodiment, controller 30 changes the position of projection region 41 in accordance with the position of head 110 of user 100 detected by sensor 20, but controller 30 is not limited to this example. For example, Controller 30 may change the position of projection region 41 in accordance with the position of the center of the body of user 100 detected by sensor 20.

Moreover, for example, controller 30 may change the position of projection region 41 in response to sensor 20 detecting a gesture involving one hand (right had 120a or left hand 120b) of user 100 moving horizontally near the periphery of projection region 41. Next, changing of the position of projection region 41 on the basis of horizontal movement of one hand of user 100 near the periphery of projection region 41 will be described with reference to FIG. 12.

Figure 12:
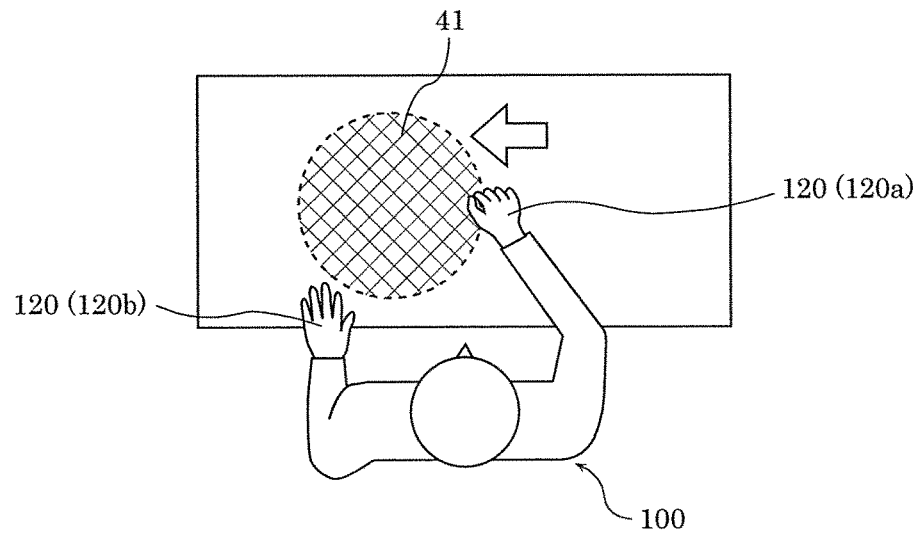
FIG. 12 is for illustrating operations for changing the position of a projection region illuminated by a lighting device performed by a lighting control device according to another embodiment.

FIG. 12 is for illustrating operations for changing the position of projection region 41 of lighting device 40 performed by lighting control device 10 according to another embodiment. FIG. 12 illustrates right hand 120a being moved left near the periphery of projection region 41.

As illustrated in FIG. 12, the position of projection region 41 can be moved left by moving right hand 120a left near the periphery of projection region 41. Although not illustrated in the drawings, the position of projection region 41 can be moved right by moving left hand 120b right near the periphery of projection region 41, similar to FIG. 12. Note that in FIG. 12, right hand 120a is shown as a fist, but the palm of right hand 120a may be open.

This allows user 100 to adjust the position of projection region 41 to a desired position.

Moreover, for example, in the above embodiment, lighting control device 10 is exemplified as including sensor 20 and controller 30 as a single unit, but this example is not limiting. For example, lighting control device 10 may include sensor 20 and controller 30 as separate units. In this case, controller 30 may be, for example, a personal computer (PC), and may communicate with sensor 20 over a wired or wireless connection.

Moreover, for example, in the above embodiment, lighting control device 10 is exemplified as controlling a single lighting device 40 but this example is not limiting. For example, lighting control device 10 may control a plurality of lighting devices 40.

Moreover, for example, in the above embodiment, controller 30 controls lighting device 40 in accordance with the detection result of a single sensor 20, but this example is not limiting. For example, a plurality of lighting devices 40 may correspond to a plurality of sensors 20, and the plurality of lighting devices 40 may be controlled in accordance with the detection results of the plurality of sensors 20.

Moreover, for example, in the above embodiment, controller 30 changes the shape of projection region 41 to an annular shape when changing the size of projection region 41, but this example is not limiting. For example, controller 30 may change the size of projection region 41 without changing the shape of projection region 41 to an annular shape.

Moreover, for example, in the above embodiment, the size of projection region 41 is fixed in response to a hand changing from a closed fist to an open hand outside of projection region 41, as illustrated in (b) in FIG. 7 and (b) in FIG. 8, but this example is not limiting. For example, the size of projection region 41 may be fixed in response to a hand changing from a closed fist to an open hand near the periphery of projection region 41 or inside projection region 41.

Moreover, for example, in the above embodiment, the size of projection region 41 is fixed in response to both hands 120 changing from closed fists to open hands, as illustrated in (b) in FIG. 7 and (b) in FIG. 8, but this example is not limiting. For example, the size of projection region 41 may be fixed in response to one hand changing from a closed fist to an open hand.

Moreover, for example, in the above embodiment, the state of both hands 120 or a hand (right hand 120a or left hand 120b) of user 100 when controlling a lighting characteristic of lighting device 40 is a closed fist state, but this example is not limiting. For example, the state of both hands 120 or a hand (right hand 120a or left hand 120b) of user 100 when controlling a lighting characteristic of lighting device 40 may be a state in which 1, 2, 3, or 4 fingers are extended, and may be an open hand state.

Moreover, for example, in the above embodiment, the state of both hands 120 or a hand (right hand 120a or left hand 120b) of user 100 when fixing a lighting characteristic of lighting device 40 is an open hand state, but this example is not limiting. For example, the state of both hands 120 or a hand (right hand 120a or left hand 120b) of user 100 when fixing a lighting characteristic of lighting device 40 may be a state in which 1, 2, 3, or 4 fingers are extended, and may be a closed hand state.

Moreover, for example, in the above embodiment, the brightness of lighting device 40 is increased (or reduced) and the color temperature is increased (or reduced) in accordance with an amount of horizontal displacement to the right (or left) of one hand of user 100, but this example is not limiting; for example, the brightness of lighting device 40 may be reduced (or increased) and the color temperature may be reduced (or increased) in accordance with an amount of horizontal displacement to the right (or left) of one hand of user 100.

Moreover, for example, in the above embodiment, when controlling the brightness or color temperature of lighting device 40, right hand 120*a* of user 100 is associated with the brightness of lighting device 40 and left hand 120*b* is associated with the color temperature of lighting device 40, but this example is not limiting. For example, right hand 120*a* of user 100 may associated with the color temperature of lighting device 40 and left hand 120*b* may be associated with the brightness of lighting device 40.

Moreover, for example, in the above embodiment, the brightness or color temperature of lighting device 40 is controlled in accordance with an amount of horizontal displacement in a side-to-side direction of one hand of user 100, but this example is not limiting. For example, the brightness or color temperature of lighting device 40 may be controlled in accordance with an amount of horizontal displacement in a front-and-back direction of one hand of user 100. Moreover, for example, the brightness or color temperature of lighting device 40 may be controlled in accordance with an amount of vertical displacement of one hand of user 100, but this example is not limiting.

Moreover, for example, in the above embodiment, when controlling the brightness or color temperature of lighting device 40, the brightness or color temperature of lighting device 40 is changed in accordance with an amount of displacement of one hand of user 100 inside projection region 41, but this example is not limiting. For example, the brightness or color temperature of lighting device 40 may be changed in accordance with an amount of displacement of one hand of user 100 outside the range of projection region 41. However, in this case, a gesture involving one hand inside projection region 41 illuminated by lighting device 40 gives user 100 a sensation of operating lighting device 40 more so than a gesture involving one hand outside the range of projection region 41. Thus, when controlling the brightness or color temperature of lighting device 40, the brightness or color temperature of lighting device 40 is preferably changed in accordance with an amount of displacement of one hand of user 100 inside projection region 41.

General or specific aspects of the present disclosure may be realized as a system, method, integrated circuit, computer program, computer readable medium such as a CD-ROM, or any given combination thereof.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A lighting control device, comprising:
   a sensor that detects a state of a user and acquires a gesture made by the user; and
   a controller that controls a lighting characteristic of a lighting device,
   wherein the controller:
      determines whether a gesture made by the user and acquired by the sensor matches a first predetermined gesture including a predetermined hand shape and a predetermined movement of both hands of the user made within a detecting region between a boundary 30% larger than a periphery of a projection region illuminated by the lighting device and a boundary 30% smaller than the periphery of the projection region; and
      changes a size of the projection region when the controller determines that the gesture matches the first predetermined gesture.

2. The lighting control device according to claim 1, wherein the controller changes the size of the projection region when the controller determines that the gesture involves a movement of changing a distance between both of the hands made within the detecting region.

3. The lighting control device according to claim 1, wherein when the controller changes the size of the projection region, the controller changes a shape of the projection region to an annular shape.

4. The lighting control device according to claim 1, wherein the controller:
   changes a shape of the projection region to an annular shape when the controller determines that the gesture involves both of the hands being made into fists within the detecting region, and
   changes a size of the projection region in the annular shape when the controller determines that the gesture involves a movement of changing a distance between both of the hands while both of the hands are made into fists.

5. The lighting control device according to claim 4, wherein the controller stops changing the size of the projection region when the controller determines that the gesture involves at least one hand of the user changing from a closed fist to an open hand.

6. The lighting control device according to claim 1, wherein the controller:
   increases the size of the projection region when the controller determines that the gesture involves both of the hands holding the projection region within the detecting region, and
   reduces the size of the projection region when the controller determines that the gesture involves both of the hands holding the projection region within the detecting region and then a movement of moving closer together.

7. The lighting control device according to claim 1, wherein the controller:
   determines whether a gesture made by the user and acquired by the sensor matches a second predetermined gesture including at least one of a predetermined hand shape and a predetermined movement of one hand of the user; and
   changes at least one of a brightness and a color temperature of the lighting device when the controller determined that the gesture matches the second predetermined gesture.

8. The lighting control device according to claim 7, wherein the controller changes at least one of the brightness and the color temperature of the lighting device when the controller determines that the gesture involves the one hand while the one hand is made into a fist.

9. The lighting control device according to claim 8, wherein the controller changes at least one of the brightness and the color temperature of the lighting device when the controller determines that the gesture involves a movement involving the one hand moving horizontally while the one hand is made into a fist.

10. The lighting control device according to claim 1, wherein the controller changes a position of the projection region in accordance with a position of a head of the user acquired by the sensor.

11. The lighting control device according to claim 1, wherein the controller changes a position of the projection region when the controller determines that the gesture involves a movement involving one hand of the user moving horizontally within the detecting region.

12. The lighting control device according to claim 1, wherein the controller turns off the lighting device when the sensor does not detect the user in a given range.

13. The lighting control device according to claim 1, wherein the sensor includes a camera.

14. The lighting control device according to claim 13, wherein the camera is an infrared camera.

15. A lighting system, comprising:
the lighting control device according to claim 1; and
the lighting device that is controlled by the lighting control device, the projection region illuminated by the lighting device being changeable in size.

16. The lighting system according to claim 15, wherein:
the projection region is formed on a desk, and
the lighting device illuminates the desk from above.

17. A method of controlling a lighting device, comprising:
determining whether a gesture made by a user and acquired by a sensor matches a first predetermined gesture including a predetermined hand shape and a predetermined movement of both hands of a user made within a region between a boundary 30% larger than a periphery of a projection region illuminated by the lighting device and a boundary 30% smaller than the periphery of the projection region; and
changing a size of the projection region when it is determined that the gesture matches the predetermined gesture.

* * * * *